United States Patent [19]

Nomura et al.

[11] Patent Number: 5,408,599
[45] Date of Patent: Apr. 18, 1995

[54] EDITING APPARATUS FOR SIMULTANEOUSLY EDITING TWO DIFFERENT TYPES OF DATA WITH A SINGLE EDIT COMMAND

[75] Inventors: Naoyuki Nomura; Kazunori Muraki, both of Tokyo, Japan

[73] Assignee: NEC Corporation, Tokyo, Japan

[21] Appl. No.: 846,473

[22] Filed: Mar. 6, 1992

[30] Foreign Application Priority Data

Mar. 14, 1991 [JP] Japan .................................. 3-073708

[51] Int. Cl.$^6$ .............................................. G06F 3/14
[52] U.S. Cl. ............................. 395/147; 364/DIG. 2; 364/943
[58] Field of Search ................. 395/146, 147, 600, 700

[56] References Cited

U.S. PATENT DOCUMENTS

| | | | |
|---|---|---|---|
| 4,723,211 | 2/1988 | Barker et al. | 395/147 |
| 4,815,029 | 3/1989 | Barker et al. | 395/146 |
| 5,197,122 | 3/1993 | Miyoshi et al. | 395/148 |
| 5,208,905 | 5/1993 | Takakura et al. | 395/148 |

FOREIGN PATENT DOCUMENTS

| | | |
|---|---|---|
| 0215203 | 3/1987 | European Pat. Off. . |
| 0240920 | 10/1987 | European Pat. Off. . |
| 0361870 | 4/1990 | European Pat. Off. . |
| 3-111967 | 5/1991 | Japan . |

OTHER PUBLICATIONS

Mark Frisse, "From Text to Hypertext", BYTE, Oct. 1988, pp. 247–253.

Primary Examiner—Thomas G. Black
Assistant Examiner—John C. Loomis
Attorney, Agent, or Firm—Foley & Lardner

[57] ABSTRACT

Corresponding portions between data having different data formats, such as document data and figure data, are automatically managed to save labors for retrieving or updating. A general editing apparatus is additionally equipped with a display managing means, a means for managing related portions in a first kind of data, a means for managing related portions between the first kind of data and a second kind of data, and a means for managing related portions in the second kind of data. The related portions to be simultaneously referred to and updated are automatically managed and updated regardless of the different data formats.

4 Claims, 5 Drawing Sheets

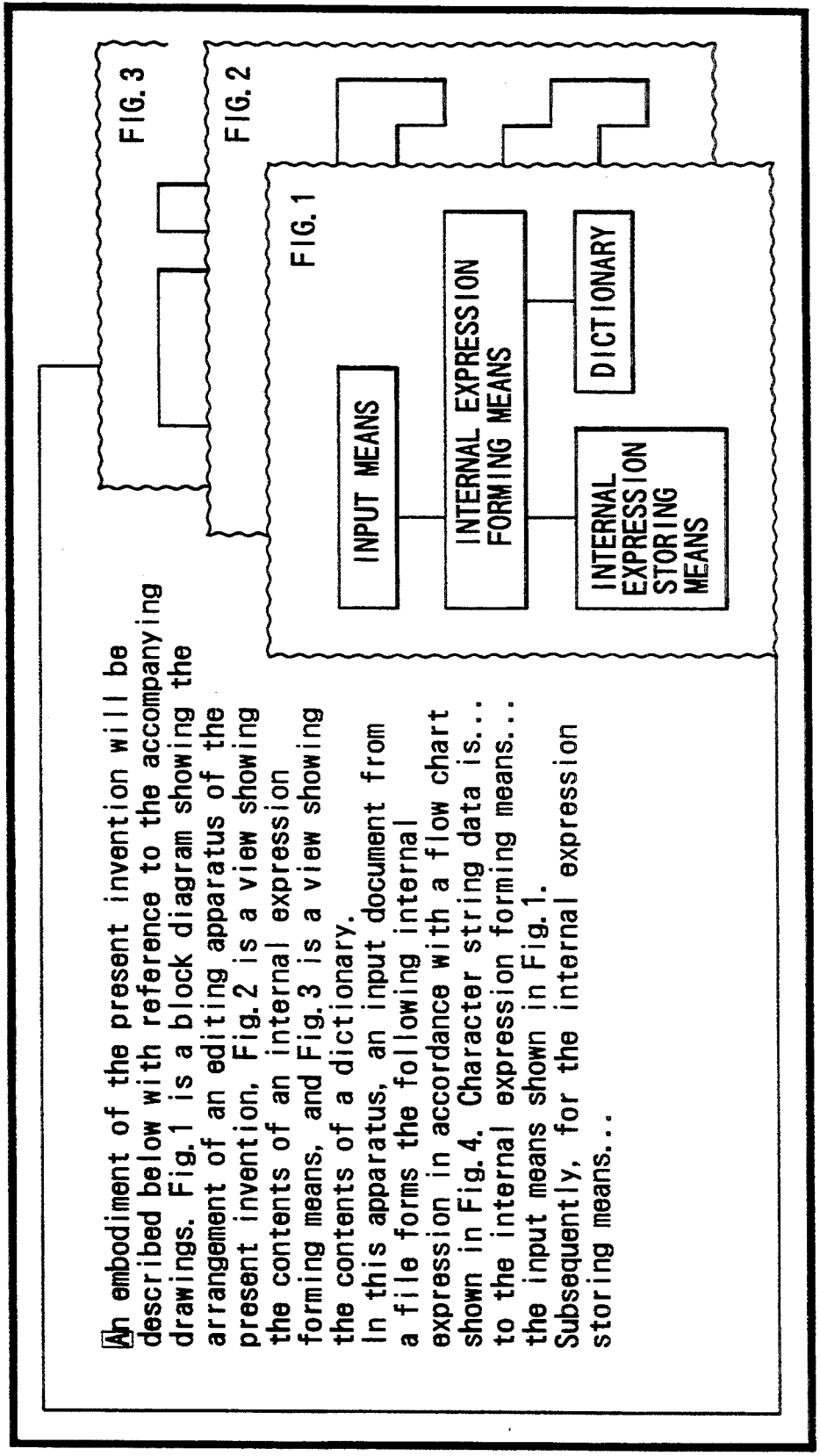

FIG. 3

"DISPLAY SCREEN OF DISPLAY MEANS 4 AFTER CURSOR IS MOVED"

An embodiment of the present invention will be described below with reference to the accompanying drawings. Fig.1 is a block diagram showing the arrangement of an editing apparatus of the present invention, Fig.2 is a view showing the contents of an internal expression forming means, and Fig.3 is a view showing the contents of a dictionary.
In this apparatus, an input document from a file forms the following internal expression in accordance with a flow chart shown in Fig.4. Character string data is... to the internal expression forming means... the input means shown in Fig.1. Subsequently, for the internal expression storing means...

START

INPUT MEANS

INTERNAL EXPRESSION FORMING MEANS

DICTIONARY

INTERNAL EXPRESSION STORING MEANS

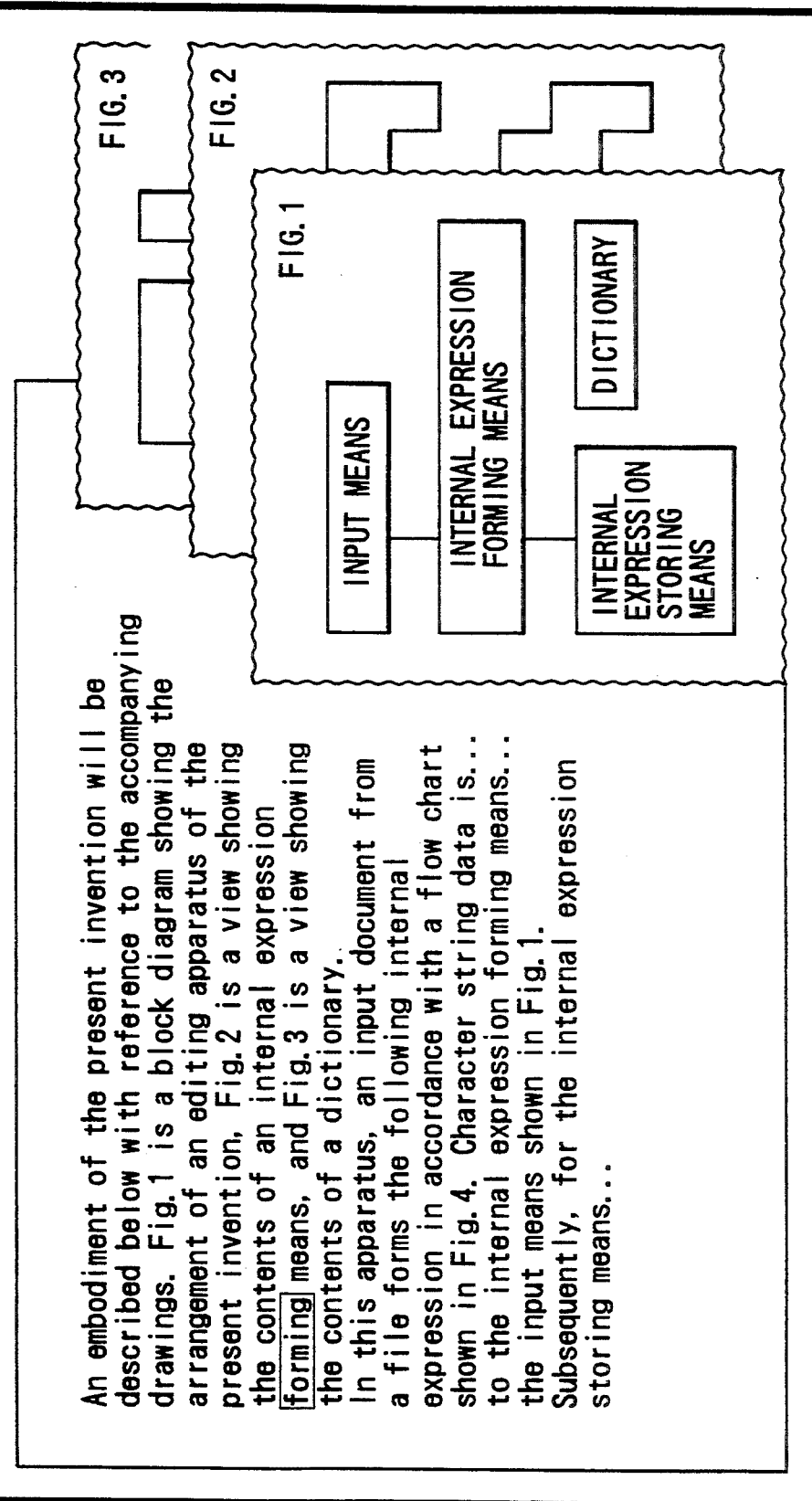

EDITING APPARATUS FOR SIMULTANEOUSLY EDITING TWO DIFFERENT TYPES OF DATA WITH A SINGLE EDIT COMMAND

BACKGROUND OF THE INVENTION

The present invention relates to an editing apparatus which is widely used in a variety of industrial fields, such as OA, research, development, education, publishing, and finance to provide a function of retrieving and editing electronic data.

Recently, easy-to-operate editing apparatuses, as of wordprocessing or spread sheet programs, are acquiring several millions of general users, and it therefore can be assumed that a latent demand for an editing apparatus capable of editing different kinds of related electronic data is becoming strong. For this reason, conventional editing apparatuses start to provide a unified function of editing different kinds of electronic data on the same screen, an electronic publishing (DTP) function having one characteristic feature of expressing different kinds of electronic data on a single file, or a MIDI interface for editing sampled sounds and software for outputting the edited sounds in the form of musical scores. In addition, a wordprocessor with a proofreading function, such as a spell checker, is becoming commercially available as an intelligent editing apparatus for a single kind of data.

Even the use of these unified functions, however, can realize only saving of a time and labors required to initialize each software programs. That is, there has not been provided a labor-saving function capable of automatically loading different kinds of electronic data referred to each other, or automatically retrieving or updating an equivalent description on the basis of a comparison between different kinds of electronic data.

More specifically, in a document editing apparatus for simultaneously editing both documents and figures, for example, in order to retrieve a list of figures or a set of figures being referred in a given set of descriptions, an operator must type character strings by tracing back his or her memory, thereby retrieving a figure file. In addition, when the name of a newly defined technical term in a document is changed, a user must correct a document file and a figure file. In this case, a user who is forced to repeatedly perform the same operation may make mistakes upon correction. This also indicates a serious drawback of this conventional apparatus.

Japanese Patent Application No. 1-251496 (Japanese Patent Laid-Open No. 3-111967)discloses an arrangement of an editing apparatus for processing only documents as an example of a single kind of data, which is assumed to solve the above conventional problems. With this arrangement, it is possible to analyze an input document, hold an internal linguistic structure of the analyzed document, and designate an object to be edited for each of various syntactic units. However, Japanese Patent Application No. 1-251496 does not touch upon any technique applicable to a case where objects to be edited involve both different kinds of data such as document and figure data.

SUMMARY OF THE INVENTION

It is an object of the present invention to provide an editing apparatus capable of simultaneously retrieving and editing a plurality of kinds of data, such as document data and figure data.

In order to achieve the above object of the present invention, there is provided an editing apparatus including input means for inputting at least data and an edit command in order to input, edit, and manage related data having different data formats, editing means for sorting the data and the edit command input from the input means to execute an edit function if the edit command is input, data storing means for storing various data, and display means for displaying the data stored by the data storing means and the contents of editing executed by the editing means, comprising means for managing related portions in a first kind of data, the means extracting, storing, and updating related portions between individual components of the first kind of data stored by the data storing means, means for managing related portions in a second kind of data, the means extracting, storing, and updating related portions between individual components of the second kind of data stored by the data storing means, means for managing related portions between data of first and second kinds, the means extracting, storing, and updating the related portions between the first and second kinds of data stored by the data storing means, and display managing means, belonging to the display means, for selecting the related data and the contents of editing as objects to be displayed from the contents of the editing means, the contents of the means for managing related portions in a first kind of data, the contents of the means for managing related portions in a second kind of data, and the contents of the means for managing related portions between the first and second kinds of data, wherein data having at least two different data formats are simultaneously and simply retrieved and edited.

According to the present invention, in an editing apparatus capable of simultaneously retrieving and editing a plurality of kinds of data, such as document data and figure data, it is possible to simultaneously retrieve or update related portions between data referred to each other. As a result, editing can be performed by a smaller number of operations than in any conventional editing apparatus.

BRIEF DESCRIPTION OF DRAWINGS

FIG. 2 is a view showing an example of document-figure linkage retrieval;

FIG. 3 is a view showing an example of document-figure linkage writing;

FIG. 4 is a view showing an example of document-figure linkage writing; and

DETAILED DESCRIPTION OF THE PREFERRED EMBODIMENT

Figure 1:
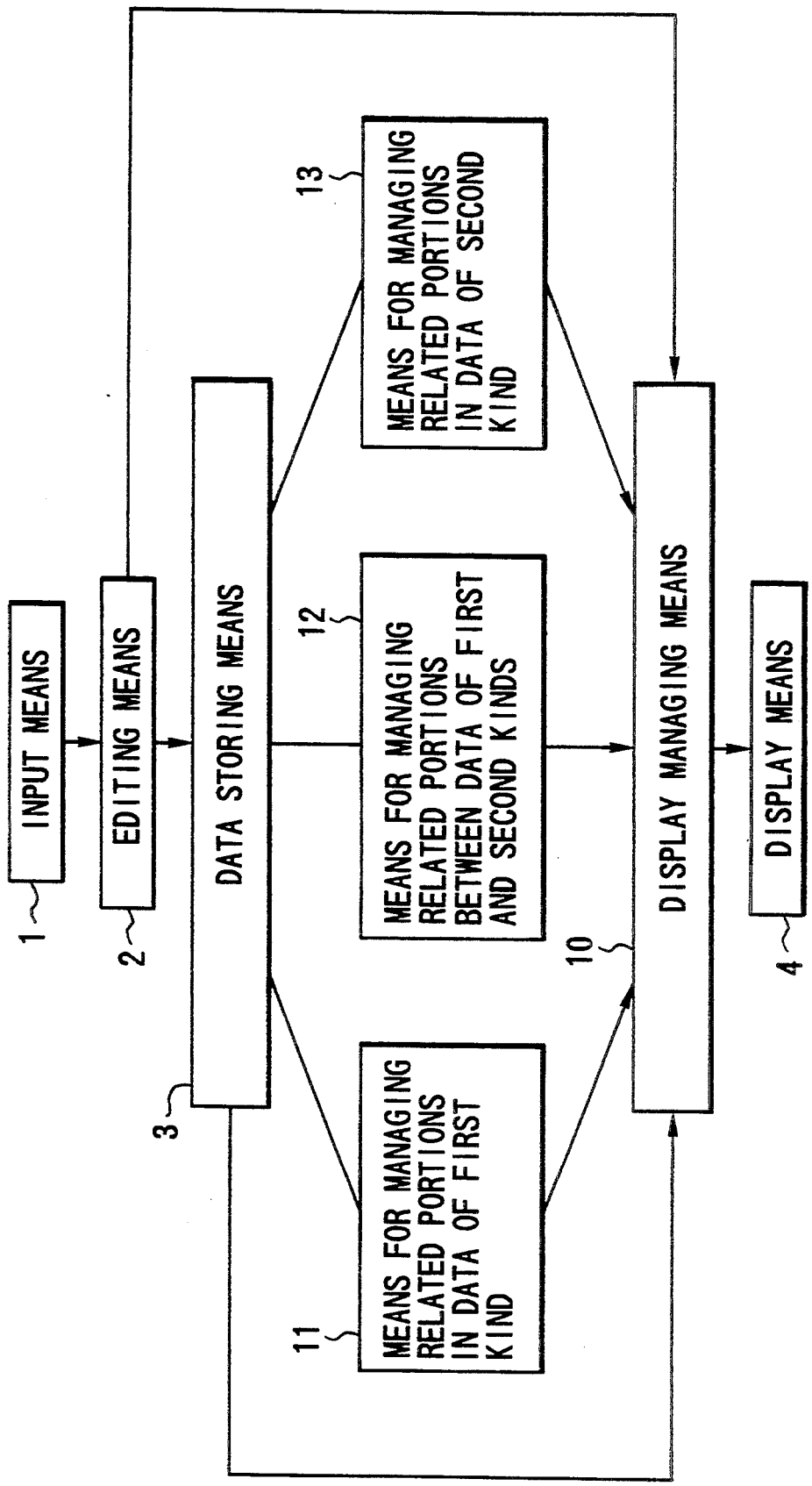
FIG. 1 is a block diagram showing the arrangement of an editing apparatus.
Figure 5:
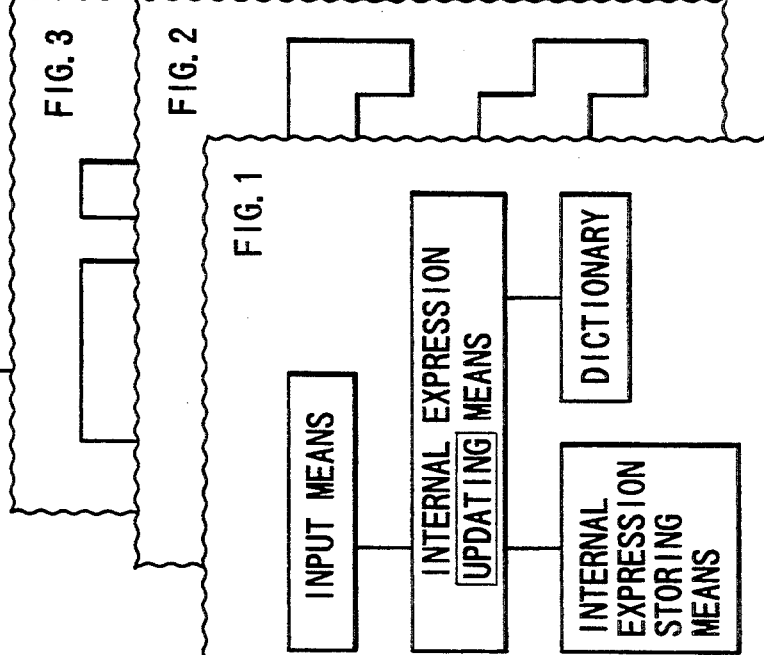
FIG. 5 is a view showing an example of document-figure linkage writing.

An embodiment of the present invention will be described below with reference to the accompanying drawings. This embodiment will be explained by taking a combination of document data and figure data as an example of two kinds of data having different data formats. FIG. 1 shows the arrangement of an editing apparatus according to the embodiment of the present invention. FIGS. 2 and 3 show examples of operations of document-figure linkage retrieval realized in the apparatus shown in FIG. 1, in which FIG. 2 shows "display screen of display means 4 before cursor is moved", and FIG. 3 shows "display screen of display means 4 after cursor is moved". FIGS. 4 and 5 show examples of operations of document-figure linkage editing realized in the apparatus shown in FIG. 1, in which FIG. 4 shows "display screen of display means 4 before replacement of phrases", and FIG. 5 shows "display screen of display means 4 after replacement of phrases".

The editing apparatus shown in FIG. 1 comprises an input means 1 for inputting at least data and an edit command in order to input, edit, and manage related data of different formats, such as documents, figures, tables, sounds, and images; an editing means 2 for sorting the data and edit command input from the input means, and executing an edit function if an edit command is present; a data storing means 3 for storing various kinds of data; a display means 4 for displaying the data stored by the data storing means 3 and the contents of editing executed by the editing means 2; a means 11 for managing related portions in a first kind of data, which extracts, stores, and updates related portions between individual component of the first kind of data stored in the data storing means 3; a means 13 for managing related portions in a second kind of data, which extracts, stores, and updates related portions between individual component of the second kind of data stored in the data storing means 3; a means 12 for managing the related portions between the data of the first and second kinds, which extracts, stores, and updates related portions between the first and second kinds of data stored in the data storing means 3; and a display managing means 10 which belongs to the display means 4 and selects, as objects to be displayed, the related data and the contents of editing in accordance with the contents of the editing means 2, the data storing means 3, the means 11 for managing related portions in a first kind of data, the means 13 for managing related portions in a second kind of data, the means 13 for managing related portions in a second kind of data, and the means 12 for managing the related portions between the first and second kinds of data.

The operation of this embodiment will be described below.

When document data as illustrated in the left-side portion of a screen shown in each of FIGS. 2 and 3 is input through the input means 1, the input data is immediately supplied to the editing means 2. This data is determined to be a first kind of data and stored in the data storing means 3. When figure data as illustrated in the right-side portion of each screen is input through the input means 1, the input data is immediately supplied to the editing means 2. This data is determined to be a second kind of data and stored in the data storing means 3.

These two kinds of data stored in the data storing means 3 are displayed on the display means 4 via the display managing means 10. In this case, the display means 4 displays a display position determined on the basis of a command supplied to the display managing means 10 through the input means 1 and the editing means 2, or a display position that the display managing means 10 determines on the basis of limitations, such as the limit of display quantity defined by the screen size of the display means 4.

In the left-side portion of "display screen of display means 4 before cursor is moved" shown in FIG. 2, a cursor is present at the head of a first paragraph of the displayed document. In this state, a user repeatedly inputs an edit command of "down cursor" movement to the input means 1 a necessary number of times while monitoring the display means 4. The input edit commands of "down cursor" movement are sequentially supplied to the editing means 2 and interpreted as an edit function. Thereafter, the command is supplied to the display managing means 10. Each time the edit command of "down cursor" movement is input, the display managing means 10 moves the display position of the cursor downward by one line and causes the display means 4 to display the moved cursor.

When the cursor position is moved down to the head of the next paragraph as shown in the left-side portion of "display screen of display means 4 after cursor is moved" of FIG. 3, the display managing means 10 refers to the format of the first kind of data, i.e., the document data stored in the data storing means 3 and detects that a paragraph where the cursor position is present is changed. In this case, the display managing means 10 extracts information about a list of the second kind of data, i.e., figures explained or referred to in the paragraph where the new cursor position is present from the means 12 for managing related portions between the first and second kinds of data.

On the basis of the information about a list of figures thus extracted, the display managing means 10 extracts the second kind of data, i.e., a set of figures explained or referred to in the paragraph where the new cursor position is present from the data storing means 3. The display managing means 10 supplies the extracted set of figures to the display means 4 and causes the display means 4 to display them. In this case, the display managing means 10 erases the set of figures illustrated in the right-side portion of FIG. 2 in correspondence with the immediately preceding paragraph, and displays the new set of figures, thereby switching to the display illustrated in the right-side portion of "display screen of display means 4 after cursor is moved" in FIG. 3.

An operation which is performed when two kinds of data having different data formats are to be edited and updated at the same time in order to update a plurality of portions, which are related to each other and required to be updated simultaneously, with a small number of inputs will be described below with reference to FIGS. 4 and 5.

Assume that document data, i.e., the first kind of data illustrated in the left-side portion of "display screen of display means 4 before replacement of items" in FIG. 4 and figure data, i.e., the second kind of data shown in its right-side portion are stored in the data storing means 3. In this state, suppose that a user changes a phrase "internal expression forming means" in the displayed document data into a phrase "internal expression updating means". In this case, assume that the means 11 for managing related portions in a first kind of data holds information about portions in the document data where this original phrase is used, and that the means 12 for managing related portions between data of first and second kinds holds information about portions in the figure data where the phrase is used. In particular, the expression in the figure data may be held in the form of image information constituted by a bit map expressed by character codes.

First, a user performs deletion of a character string "forming" via the input means 1 and the editing means 2. Consequently, the corresponding portion of the document data stored in the data storing means 3 is deleted, and this is reflected on the display means 4 via the display managing means 10. At the same time, information indicating deletion of the corresponding portion is supplied to the means 11 for managing related portions in a first kind of data and the means 12 for managing related portions between the first and second kinds of data.

Next, the user inputs a character string "updating" in that portion via the input means 1 and the editing means 2. As a result, data "updating" is inserted into the corresponding portion of the document data stored in the data storing means 3, and this is reflected on the display means 4 via the display managing means 10. At the same time, information indicating input of the corresponding portion is supplied to the means 11 for managing related portions of a first kind of data and the means 12 for managing related portions between the first and second kinds of data.

Upon receiving a series of pieces of information indicating the deletion and input for the same portion, the means 11 for managing related portions in a first kind of data executes a function of replacing the entire phrase "internal expression forming means" with "internal expression updating means" in every portion where the phrase including the deleted character string is used in other components of the document data stored in the data storing means 3 by using information about these portions. This replacement is performed in the data storing means 3 and reflected on the display means 4 via the display managing means 10. In this case, if a portion where the replacement is executed is not displayed on the display means 4, a display window is opened using a maximum display area of the display means 4 so as not to hide a current cursor position or other replaced portions, thereby highlighting the replaced portion on the display.

Similarly, upon receiving the series of pieces of information indicating the deletion and input, the means 12 for managing related portions between the first and second kinds of data executes a function of replacing the entire phrase "internal expression forming means" with "internal expression updating means" in every portion where the phrase including the deleted character string is used in other components of the figure data stored in the data storing means 3 by using information about these portions. This replacement is performed in the data storing means 3 and reflected on the display means 4 via the display managing means 10. In this case, if a portion where the replacement is executed is not displayed on the display means 4, a display window is opened using the maximum display area of the display means 4 so as not to hide a current cursor position or other replaced portions, thereby highlighting the replaced portion on the display. Consequently, the display means 4 displays "display screen of the display means 4 after replacement of phrases" shown in FIG. 5.

As described above, the result of updating one portion of document data is automatically reflected on other components of the document data including portions not displayed on the display means 4 on the basis of information stored in the means 11 for managing related portions in a first kind of data. Simultaneously, the equivalent updating is automatically reflected on figure data, and the updated content can be monitored on the display means 4. In contrast to this, when a portion of figure data having the equivalent description in document data is updated, this updating is executed throughout the entire figure and document data, and the contents of updating can be monitored.

Suppose that an operation of replacing the entire phrase "internal expression forming means" with "internal expression updating means" in figure data is performed by a certain method via the input means 1 and the editing means 2. In this case, as in the case of the document data, the means 13 for managing related portions in a second kind of data receives a series of pieces of information indicating the deletion and input for the same portion, and executes a function of replacing the entire phrase "internal expression forming means" with "internal expression updating means" in every portion where the phrase including the deleted character string is used in other components of the figure data stored in the data storing means 3 by using information about these portions. This replacement is performed in the data storing means 3 and reflected on the display means 4 via the display managing means 10. In this case, if a portion where the replacement is executed is not displayed on the display means 4, a display window is opened using a maximum display area of the display means 4 so as not to hide a current cursor position or other replaced portions, thereby highlighting the replaced portion on the display.

Likewise, upon receiving the series of pieces of information indicating the deletion and input, the means 12 for managing related portions between the first and second kinds of data executes a function of replacing the entire phrase "internal expression forming means" with "internal expression updating means" in every portion where the phrase including the deleted character string is used in other components of the document data stored in the data storing means 3 by using information about these portions. This replacement is performed in the data storing means 3 and reflected on the display means 4 via the display managing means 10. If a portion where the replacement is executed is not displayed on the display means 4, a window is opened using the maximum display area of the display means 4 so as not to hide a current cursor position or other replaced portions, thereby highlighting the replaced portion on the display.

As described above, when two kinds of data having different data formats are to be edited and updated, a plurality of portions which are related to each other between the two kinds of data and must be updated at the same time can be changed by changing only one portion of either data. This function is called a linkage editing function. The above-mentioned function, which is used when a plurality of kinds of data are to be referred, retrieved, or updated in order to display portions of interest related between that data and the other kinds of data, is called a linkage retrieving function. As described above, the apparatus having the arrangement shown in FIG. 1 realizes the linkage retrieving function and the linkage editing function for simultaneously retrieving and updating two kinds of data having different data formats.

The above embodiment has been explained by taking the case in which document data and figure data are edited at the same time as an example. However, as described in the scope of claims, the linkage retrieving and editing functions of the editing apparatus according to the present invention can be similarly applied when a function of simultaneously editing data having different data formats, such as documents, figures, graphs, sounds, and images, is to be presented.

Of the means shown in FIG. 1, the display managing means 10 and the display means 4 can be integrated with each other. In addition, it is possible to overlap the data storing means 3, the means 11 for managing related portions in a first kind of data, the means 12 for managing related portions between the first and second kinds of data, and the means 13 for managing related portions in a second kind of data on a single memory means.

According to the present invention, in an editing apparatus for simultaneously retrieving and editing a plurality of kinds of data, such as document data and figure data, related portions between data referred to each other can be retrieved or updated at the same time. As a result, editing can be realized with a smaller number of operations than in any conventional editing apparatus.

What is claimed is:

1. A method for simultaneously editing data using an editing apparatus, said editing apparatus including a memory, storing data of at least a first kind of data and second kind of date, said first and said second kind of data having different data formats, a display for displaying portions of said data stored in said memory and an editing input means, said method comprising the steps of:

receiving an edit a content of command to edit a portion of said first kind of data through said editing input means;

updating said portion of said first kind of data stored in said memory in response to said edit command;

determining a related portion of said second kind of data which is related to said portion of said first kind of data; and simultaneously updating said related portion of said second kind of data stored in said memory with said updating of said portion of said first kind of data in accordance with said edit command to edit said first kind of data.

2. A method as recited in claim 1, wherein said first kind of data is text and said second kind of data is graphic data including bit map expressed character codes.

3. A method as recited in claim 2, wherein:

said edit command requests an update of a text string in said first kind of data;

said related portion of said second kind of data is a portion of said bit map expressed character codes in said graphic data representing a same phrase as said text string in said first kind of data requested for said update by said edit command; and said simultaneously updating step updates said same phase in said graphic data to reflect a same change as is carried out by said update of said text string in said first kind of data.

4. An editing apparatus including input means for inputting at least data and an edit command in order to input, edit, and manage related data having different data formats, editing means for identifying the edit command input from said input means to execute an edit function if the edit command is input, data storing means for storing various data, and display means for displaying the data stored by said data storing means and the contents of editing executed by said editing means, comprising:

first means for managing related portions in a first kind of data, said first means extracting, storing, and updating related portions between individual components of the first kind of data having a first data format and being stored in said data storing means;

second means for managing related portions in a second kind of data, said second means extracting, storing, and updating related portions between individual components of the second kind of data having a second data format different from said first data format and being stored in said data storing means;

third means for managing related portions between data of said first and second kinds, said third means extracting, storing, and updating the related portions between the first and second kinds of data stored by said data storing means; and display managing means, belonging to said display means, for selecting related data and contents of editing as objects to be displayed from the contents of said editing means, the contents of said first means, the contents of said second means, and the contents of said third means, wherein said first and second kind of data are simultaneously and simply retrieved and when a specific edit command is initiated and carried out to edit a content of a particular portion of said first kind of data, a content of a portion of said second kind of data related to the particular portion under control of said third means is simultaneously edited in a manner corresponding to the specific edit command.

* * * * *